United States Patent [19]

Vanderhoff et al.

[11] 4,247,434

[45] Jan. 27, 1981

[54] PROCESS FOR PREPARATION OF LARGE-PARTICLE-SIZE MONODISPERSE

[76] Inventors: Alan M. Lovelace, Administrator of the National Aeronautics and Space Administration, with respect to an invention of John W. Vanderhoff, Bethlehem, Pa.; Fortunato J. Micale, Bethlehem, Pa.; Mohamed S. El-Aasser, Bethlehem, Pa.; Dale M. Kornfeld, Huntsville, Ala.

[21] Appl. No.: 974,474

[22] Filed: Dec. 29, 1978

[51] Int. Cl.$^3$ .................................................. C08F 2/22
[52] U.S. Cl. ............................... 260/29.6 RB; 526/88; 526/201
[58] Field of Search ................. 526/88, 201, 202, 203; 260/29.6 RB, 29.7 D, 29.7 DP, 29.7 UP

[56] References Cited

U.S. PATENT DOCUMENTS

| | | | |
|---|---|---|---|
| 3,424,706 | 1/1969 | Smith | 260/29.6 RB |
| 4,011,388 | 3/1977 | Murphy | 526/201 |
| 4,079,101 | 3/1978 | Duke | 526/201 |
| 4,094,841 | 6/1978 | Mani | 260/29.6 Z |

*Primary Examiner*—Paul R. Michl
*Attorney, Agent, or Firm*—L. D. Wofford, Jr.; John R. Manning; Joseph H. Beumer

[57] ABSTRACT

Monodisperse latexes having a particle size in the range of 2 to 40 microns are prepared by seeded emulsion polymerization in microgravity. A reaction mixture containing smaller monodisperse latex seed particles, predetermined amounts of monomer, emulsifier, initiator, inhibitor and water is placed in a microgravity environment, and polymerization is initiated by heating. The reaction is allowed to continue until the seed particles grow to a predetermined size, and the resulting enlarged particles are then recovered. A plurality of particle-growing steps can be used to reach larger sizes within the stated range, with enlarged particles from the previous steps being used as seed particles for the succeeding steps. Microgravity enables preparation of particles in the stated size range by avoiding gravity-related problems of creaming and settling, and flocculation induced by mechanical shear that have precluded their preparation in a normal gravity environment.

10 Claims, No Drawings

PROCESS FOR PREPARATION OF LARGE-PARTICLE-SIZE MONODISPERSE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to emulsion polymerization and more particularly to the preparation of large-particle-size monodisperse latexes by seeded emulsion ploymerization in microgravity.

Many applications exist for chemically inert polymeric spherical particles having a uniform size in the multimicron range. Such particles are utilized in the form of a monodisperse latex; "monodisperse" being defined as having a standard deviation of particle size of one percent or less and "latex" being defined as a stable emulsion made up of a polymeric material dispersed in an aqueous continuous phase. Monodisperse latexes have been used for calibration of various instruments, the known uniform size of the polymer particles providing a reference standard. In the field of medical research, monodisperse latexes provide a useful tool for measurement of pore sizes in body membranes. For example latex particles 2 microns in diameter have been used in studies to determine the tendency of foreign particles to penetrate the pores of intestinal walls and enter body tissue. Serological diagnostic tests for disease such as rheumatoid arthritis also utilize monodisperse latexes. Numerous other applications are awaiting the availability of monodisperse latexes at particle sizes of interest above 2 microns.

Monodisperse latexes having particles up to approximately 2 microns in diameter have been prepared by seeded emulsion polymerization in practical quantities, particles as large as 5.6 microns in 100 gram quantities and particles as large as 12 microns in microscopic quantities, but no method exists for preparation of monodisperse particles in practical quantities in the size range over 2 microns. In existing processes for preparing the 2 micron and smaller latexes a monodisperse latex having a very small particle size of several tenths of a micron is first prepared from the monomer and is then used as "seed" for growing larger particles. The initial seed particle preparation step is well known, and relatively easy to perform. However, particle growing steps become increasingly difficult with larger particle sizes, and a practical maximum is reached at about 2 microns.

Difficulties with growing large-particle-size (over 2 micron) latexes are believed to result from exceeding the size range in which colloidial and surface properties determine the behavior of the system and entering the range in which bulk properties are determinitative. At relatively small particle sizes (0.2 to 0.4 micron) the particle growth process can be readily controlled by use of an amount of emulsifier large enough to prevent coagulation but small enough to avoid formation of new particles. The emulsifier concentration range that gives no coagulum and no new particles is relatively broad. However, as the particles are grown to larger and larger sizes in successive seeding steps it becomes increasingly difficult to maintain a stable, uncoagulated emulsion without forming new particles and thereby destroying monodispersity of the latex. The effective range of emulsifier concentration becomes more and more narrow until at 1 to 2 microns the reaction becomes unpredictable; duplicate polymerizations may give either a relatively unstable (during polymerization) monodisperse latex or a stable latex with a crop of new particles. At sizes over 2 microns the process is virtually inoperative or at best effective only for very small quantities and not amenable to scale-up.

The principal reason for instability of large-particle-size monodisperse latexes is the tendency of particles to settle or cream upon standing. The critical size for settling in the case of polystyrene particles (density 1.050 gm/cc) in water is 0.65 micron. It can be proven experimentally that polystyrene particles of 0.8 micron or larger diameter slowly settle out upon standing, while particles of 0.5 or smaller diameter never settle out. Therefore, the larger the particle size of the latex, the greater the tendency to settle. This tendency can be offset by agitation, and almost all emulsion polymerizations are stirred more or less rapidly to provide mixing the ingredients and good heat transfer. However, too great a stirring rate can also give irreversible coagulation of the latex particles, particularly if they are swollen with monomer, as they are during the early stages of the reaction.

The theory of coagulation of colloidial sols can be divided into two classifications: diffusion-controlled and agitation-controlled flocculation. In a given case, both mechanisms are operative but in general diffusion-controlled flocculation is predominant at particle sizes of approximately 0.1 micron, while at about 1.0 micron each mechanism is equally operative, and at sizes much larger than 1.0 micron agitation-induced flocculation is predominant. This means that in a stirred system, the formation of coagulum by flocculation of the particles to form relatively small aggregates proceeds by diffusion until the aggregates reach about 1 micron in size, after which their growth becomes autoaccelerating and they quickly become very large. Thus the tendency to form coagulum by agitation as well as the tendency to settle increases with increasing particle size.

One means of alleviating the tendency to settle and thus facilitating preparation of larger sized monodisperse particles is to go to a lower density polymeric material. Polyvinyltoluene, for example has a density of 1.027 and is thus less likely than polystyrene to settle in water. While the use of a polymer having a density near the density of water is of some assistance in preventing flocculation, the process is still impractical at sizes over 2 microns owing to creaming that results from density differences between polymer and monomer. This difference causes the density of the growing latex particles to increase during polymerization and results in a tendency of the polymer particles, which are swollen with low-density monomer, to cream during the first stages of polymerization and settle in the later stages. Changes in density during the course of polymerization thus render impossible a perfect matching of particle density with water density.

SUMMARY OF THE INVENTION

In the present invention large-particle-size monodisperse latexes are prepared by seeded emulsion polymerization in microgravity. A reaction mixture is prepared to contain monodisperse latex seed particles, predetermined amounts of monomer, emulsifier, initiator, inhibitors and water. The mixture is placed in a microgravity environment such as in outer space and polymerization is initiated by heating. Polymerization is continued until the seed particles grow to a predetermined size, and the resulting enlarged particles are recovered. This process is effective for preparing monodisperse particles in the range of 2 to 40 microns in diameter, which particle sizes have been unattainable in processes carried out under normal gravity conditions. Larger sizes within the stated range may require several successive particle growing steps, with enlarged particles from the previous step being used as seed for the succeeding step. Gravity-related problems of settling and creaming due to density differences during polymerization are avoided by the microgravity environment; the sensitivity to mechanical shear is avoided by using rates of agitation only sufficient to give good mixing and heat transfer and the previous maximum particle size for monodisperse latexes is readily exceeded.

It is therefore an object of this invention to provide monodisperse latexes having a particle size greater than 2 microns.

Another object is to provide a method of preparing monodisperse latexes having a particle size greater than 2 microns.

Still another object is to provide a seeded emulsion polymerization process for preparation of monodisperse latexes wherein settling and creaming of particles are avoided.

Another object is to provide a method of preparing large-particle-size monodisperse latexes wherein harmful effects of density differences are negated.

Other objects and advantages of the invention will be apparent from the following detailed description.

DESCRIPTION OF A PREFERRED EMBODIMENT

Although other polymers can be prepared in the form of monodisperse latexes in accordance with the invention, the following description is made primarily with reference to polystyrene. Polystyrene has been prepared in tonnage quantities by emulsion polymerization and the reactions involved have been studied extensively. Emulsion polymerization of polystyrene, and other polymers as well, involves four essential ingredients: a water medium, a monomer that is immiscible with water, an emulsifier of the oil-in-water type and a source of free radicals, normally an initiator which decomposes upon being heated. These ingredients are mixed together to form an emulsion of the monomer in water. Upon Polymerization this monomer emulsion is converted to a colloidal dispersion of polymer particles. The particles then grow until the supply of monomer or free radicals is exhausted.

Starting material for preparation of large-particle-size monodisperse polystyrene latex by the method of the invention is smaller monodisperse seed particles, preferably having the maximum obtainable size of about 2 microns. Processes for preparation of monodisperse seed particles are well-known in the art. See *Journal of Polymer Science* Vol XX, pages 225–234 ((1956)

The seed particles are combined with styrene monomer, an emulsifier, an initiator, and one or more inhibitors in a water medium, the amounts of the seed particles, styrene, emulsifier and initiator being carefully controlled to ensure growth to a predetermined size without formation of new, smaller particles, and the amount of inhibitor being carefully controlled to avoid premature polymerization as well as polymerization in the aqueous phase. Based on the number of seed particles the amount of monomer required for growth to a given size is calculated, and such amount is provided in the mixture. For example, growth from 2.02 to 3.45 microns requires a monomer-to-seed-particle weight ratio of 5 to 1 while growth from 2.02 to 4.35 microns requires a ratio of 10 to 1.

Emulsifier is provided in the reaction mixture in an amount large enough to stabilize the particles, but small enough to avoid formation of new particles. While the presence of an emulsifier in the reaction mixture is critical, in some cases the starting latex seed particle may still contain sufficient amount of absorbed emulsifier from their preparation step so that no further addition may be needed. In general an added concentration of 0 to 8 percent by weight, based on the weight of water, can be used, and about 2 to 5 weight percent is preferred. Although other emulsifiers can be used, the preferred emulsifier is an anionic surfactant, and in particular, sodium dihexyl sulfosuccinate available commercially under the trade name "Aerosol-MA". Sodium lauryl sulfate can also be used. A nonionic emulsifier such as a nonylphenol-ethylene oxide adduct or a protective colloid such as polyvinyl alcohol or methylcellulose may also be used in combination with the anionic surfactant, for the purpose of stabilizing the latex if the anionic emulsifier alone is not sufficient.

An initiator is provided in the reaction mixture in order to produce free radicals necessary for polymerization. A water soluble initiator is generally used for producing smaller particles (below 2 microns), but at the sizes of interest in this invention (over 2 microns) an oil-soluble initiator is used to prevent generation of free radicals in the aqueous phase. The initiator is selected for its capability to dissolve in the styrene monomer and remain inert until heated and then to decompose upon being heated, generating free radicals. Preferred initiators include azobisisobutyronitrile and benzoyl peroxide. The initiator can be provided at a concentration of 0.1 to 3 weight percent, based on polymer and monomer weight, and about 0.2 weight percent is preferred.

Small amounts of one or more inhibitors are also provided in the reaction mixture, the use of one type of inhibitor being optional, depending on whether the reaction mixture is to be prepared and allowed to stand for over a few hours before being transported to a microgravity environment. The optional inhibitor is an oil-soluble inhibitor such as tertbutylpyrocatechol that prevents premature activation of the reaction. A concentration of about 10 to 15 parts per million of this inhibitor is usually suitable for room temperature storage. If the reactants are not mixed together until immediately before the reactor is activated, this inhibitor would not be needed. Another inhibitor is required in all cases to repress or inhibit the formation of radicals in the water phase and destroy any radicals that diffuse into the water phase from the growing latex particles. A water-soluble/oil-insoluble inhibitor such as potassium dichromate can be used for this purpose. A concentration of 0.0001 to 0.10 percent of this inhibitor is usually sufficient to inhibit aqueous phase polymerization.

The above reactants are dispersed in a medium of deionized water, the total concentration of seed polymer and monomer being 1 to 50 percent by weight, and preferably about 20 to 30 percent by weight.

Polymerization and the particle growth that it produces are carried out by placing the mixture in a suitable reaction vessel, transporting the vessel to a microgravity environment, and heating the mixture under mild agitation. In order to avoid agitation problems from gas bubbles in microgravity the reaction vessel must be completely filled with the reaction mixture. This necessitates that the vessel be slightly flexible to accommodate an initial expansion of water upon being heated to start the reaction, with further heating resulting from the exothermic polymerization reaction, and a subsequent contraction that occurs when the monomer polymerizes. A bladder-type wall structure or a movable-piston reaction chamber can be used to allow for temperature-dependent volume changes.

The temperature of the reaction mixture is kept below 25° C. until the mixture is transported to microgravity environment on board an earth-orbiting spacecraft or the like. The mixture is then heated to decompose the initiator, a temperature of 70° C. being suitable for the initiators given above. Although a reaction temperature from 25° C. to 95° C. can be used, 60° to 80° C. is preferred. The reaction temperature is maintained until the desired extent of particle growth is realized, a period of 4 to 25 hours being required at 70° C. Longer periods provide more growth until the monomer is consumed.

In order to provide the effective heat transfer necessary for temperature control a stirring means is provided in the reaction vessel. Mild agitation is sufficient for this purpose. Heat transfer by convection does not occur in microgravity, and non-uniform heating with the vessel would otherwise result in non-uniform particle growth. The vessel is also equipped with an externally wrapped heating tape for initial heating and means such as a heat sink for subsequent removal of excess heat.

Upon completion of particle growth the resulting monodisperse particles are removed and recovered by conventional techniques.

Growth of monodisperse particles to the larger size in the range of interest may require several polymerization steps, with the product of each step being used as a seed particles for the succeeding steps. The process described above is essentially repeated in these steps, the amount of monomer being adjusted in each case depending on the number of particles, their size and extent of growth desired. Particle growth from 2 microns up to about 4 or 5 microns can be obtained in one step, and larger particles require additional steps. Up to a tenfold increase in diameter may be possible in one step.

The above description is merely illustrative, and it is to be understood that numerous changes and modifications can be employed within the spirit and scope of the invention. In particular, the invention can be applied to preparation of various other polymers in addition to polystyrene in the form of monodisperse latexes, in particular polymers and copolymers prepared from styrene derivatives such as vinyltoluene, tertbutylsytrene., α-methyl-styrene, chlorostyrene, dichlorostyrene, bromostyrene; and dienes such as butadiene, isoprene and chloroprene; acrylate esters such as methyl acrylate, ethyl acrylate, normalbutyl acrylate, isobutyl acrylate, hexyl acrylate, 2-ethylhexyl acrylate, octyldecyl and dodecyl acrylate; methacrylate esters such as methylmethacrylate, ethyl methacrylate, isopropyl methacrylate, butyl methacrylate, and 2-ethylhexyl acrylate; vinyl chloride, vinyl acetate, vinyl propionate, vinyl stearate, acrylonitrile, methacrylonitrile, ethylene, dimethyl fumarate, diethyl fumarate, dibutyl fumarate, dimethyl maleate, diethyl maleate, dibutyl maleate, dimethyl itaconate, diethyl and dibutyl itaconate; carboxyl-containing vinyl monomers such as acrylic acid, methacrylic acid, itaconic acid; sulfonate-containing vinyl monomers such as vinyl sulfonate, p-styrene sulfonate, 2-sulfoethylmethacrylate, vinyl-benzyl sulfonate; amine-containing monomers such as aminostyrene, 2-aminoethyl methacrylate, dimethylaminoethyl methacrylate, diethylaminoethyl methacrylate; hydroxyl-containing vinyl monomers such as hydroxyethyl acrylate, hydroxypropyl acrylate, hydroxyethyl methacrylate and hydroxypropyl methacrylate; amide-containing vinyl monomers such as acrylamide, methacrylamide, isobutoxyacrylamide, N-methylolacrylamide, and N-methylolmethacrylamide.

What is claimed is:

1. The method of preparing a monodisperse latex having a particle size over 2 microns which comprises:
   (a) combining monodisperse seed particles of a polymer prepared by emulsion polymerization, predetermined amounts of monomer, an emulsifier, at least one inhibitor, a heat-decomposable initiator and water in a closed reaction vessel:
   (b) disposing the reaction vessel containing the resulting mixture in a microgravity environment;
   (c) heating the mixture above the decomposition temperature of said initiator; and
   (d) maintaining the mixture in microgravity at an effective polymerization temperature under mild agitation until growth of seed particles is completed.

2. The method of claim 1 wherein said polymer is polystyrene and the monomer is styrene.

3. The method of claim 2 wherein the particle size of the seed particles is about 2 microns.

4. The method of claim 3 wherein the emulsifier is an anionic surfactant.

5. The method of claim 4 wherein the initiator is azobisisobutronitrile or benzoyl peroxide.

6. The method of claim 5 wherein the concentration of polymer and monomer in said mixture is 20 to 30 weight percent.

7. The method of claim 6 wherein said effective polymerization temperature is from 60° C. to 80° C.

8. The method of claim 1 including the additional steps of recovering the resulting enlarged particles and subjecting said particles to additional growth according to steps (a) through (d).

9. The method of claim 1 wherein said inhibitor is potassium dichromate.

10. The method of claim 9 wherein said mixture includes two inhibitors and said inhibitors are potassium dichromate and tertbutylpyrocatechol.

* * * * *

UNITED STATES PATENT AND TRADEMARK OFFICE
CERTIFICATE OF CORRECTION

PATENT NO. : 4,247,434
DATED : January 27, 1981
INVENTOR(S) : Alan M. Lovelace, et al It is certified that error appears in the above-identified patent and that said Letters Patent are hereby corrected as shown below:

On the cover sheet, section [54], and in the heading to Column 1, the title of the patent should read as follows:

Process For Preparation of Large-Particle-Size Monodisperse Latexes.

*Signed and Sealed this*

*Fifth* Day of *May 1981*

[SEAL]

*Attest:*

RENE D. TEGTMEYER

*Attesting Officer*     *Acting Commissioner of Patents and Trademarks*